United States Patent
Anderson

[19]

[11] Patent Number: 5,810,383
[45] Date of Patent: Sep. 22, 1998

[54] SUSPENSION AND STEERING LINKAGE FOR A TRICYCLE

[76] Inventor: Carey C. Anderson, 7801 14th St., Westminster, Calif. 92683

[21] Appl. No.: 779,965

[22] Filed: Dec. 23, 1996

[51] Int. Cl.$^6$ ....................................................... B60G 3/00
[52] U.S. Cl. ........................... 280/666; 280/275; 280/696
[58] Field of Search ..................................... 280/275, 283, 280/284, 666, 670, 691, 696

[56] References Cited

U.S. PATENT DOCUMENTS

| | | | |
|---|---|---|---|
| 2,007,952 | 7/1935 | Armstrong | 267/20 |
| 2,493,817 | 1/1950 | Hare | 180/25 |
| 2,717,152 | 9/1955 | Hopkins | 267/20 |
| 3,974,892 | 8/1976 | Bolger | 280/284 |
| 4,526,249 | 7/1985 | Parker | 280/275 |
| 4,664,412 | 5/1987 | Matschinsky | 280/771 |
| 4,815,762 | 3/1989 | Jurr | 280/91 |

FOREIGN PATENT DOCUMENTS

| | | | |
|---|---|---|---|
| 1221774 | 1/1960 | France | 280/701 |
| 1252770 | 12/1960 | France | 280/701 |

OTHER PUBLICATIONS

Parker, James; Motor Cyclist Magazine, Sep. 1995 pp. 18–20.

*Primary Examiner*—Daniel D. Wasil
*Attorney, Agent, or Firm*—Gene Scott-Patent Law & Venture Group

[57] ABSTRACT

A suspension and steering linkage for a front wheel of a tricycle type vehicle includes an upper and lower control arms joined by a pivot arm. The control arms are parallel and of the same length and are pivoted at the vehicle so as to move together in vertical arcuate movement with the wheel. A steering linkage engages the pivot arm to rotate the wheel about a near vertical axis. The wheel is mounted to exhibit camber when turned for steering. A shock strut is positioned at a distal end of the upper control arm and moves in reaction to vertical displacement of the wheel. Its position is such as to enable the shock to move through a reduced excursion with respect to that of the wheel.

7 Claims, 3 Drawing Sheets

SUSPENSION AND STEERING LINKAGE FOR A TRICYCLE

BACKGROUND OF THE INVENTION

1. Field of the Invention

This invention relates generally to suspensions and steering mechanisms for vehicles, and more particularly to a suspension and steering mechanism for a single wheel for use in a tricycle type vehicle.

2. Description of Related Art

Tricycle vehicles are of two basic types determined by wheel location: fore and aft. The benefits of a single wheel in front include reduced frontal area, i.e. low drag coefficient, one wheel for steering resulting in less tire wear and improved maneuverability and improved driver visibility. Tricycle vehicles are not motorcycles. These vehicles comer flat so that lateral forces must be absorbed by the suspension and wheels.

There are no known automobile suspension systems that work in a single front wheel application. The use of ball joints, control arms and bushings, a coil over shock, and steering with a control rod or "tie rod" are common elements found in the automotive industry. Most tricycle vehicles that have been built use some form of telescoping forks taken directly from motorcycles. They typically also use motorcycle tires, brakes, etc. And steer through pivoting of the entire wheel/fork assembly with "handlebars" or tiller bars. The "springer" front suspension and tire by Harley Davidson has been used on tricycles. "Center hub steering" has been used by Bimota in Italy on their motorcycle chassis. "Streamliner" motorcycles used at the Bonneville salt flats also have used them with success. But the center hub system is complex, expensive to manufacture and difficult to maintain.

Yamaha used the RADD suspension invented by James Parker on their 1995 GTS 1000 motorcycle. This suspension is a radical departure from telescoping forks, but is designed for motorcycle usage. The RADD suspension uses upper and lower control arms, a knee on one side, and suspension of the chassis from the lower control arm. This suspension is the closest in concept to the instant invention.

The following art defines the present state of this field:

Parker, James; Motor Cyclist Magazine, September 1995, p. 16. The invention provides for a motorcycle suspension and steering by using an upper control arm primarily to locate an upper steering bearing, a lower control arm for locating a lower steering bearing and for carrying shock loads, and a pivot arm mounted between these two control arms. The lower control arm is shock mounted so as to handle almost all road forces on the vehicle, including side loads, steering related forces and shock forces absorbed by the front wheel of the motorcycle. A shock absorbing means is directly attached to the lower control arm immediately adjacent to the steered wheel. Steering forces are directed to the pivot arm by the cycle's handlebars.

Hare, U.S. Pat. No. 2,493,817 describes a powered three-wheeled vehicle. The invention provides an improved and novel chassis composed of a rigid, vertical upper frame to which a rigid horizontal frame is flexibly connected by two relatively widely spaced ball joints so as to enable the upper frame to tilt during the steering of the vehicle about an axis passing through the point of rear wheel contact with the road and a point above the front wheels on the head of the handle barpost.

Armstrong, U.S. Pat. No. 2,007,952 describes a suspension arrangement for road or other vehicles. The frame of the vehicle has a pair of pivots displaced from one another, carrying levers, the opposite ends of which are attached to an axle of a wheel, the displacement of the levers about their pivots being restrained to a desired degree by means of springs or other resilient means.

Jurr, U.S. Pat. No. 4,815,762 describes a wheel suspension for steerable wheels of motor vehicles, especially for rear wheels which includes a wheel carrier supporting the wheel. Of the wheel guide members (upper triangular guide member, lower individual cross guide members) one guide member is displaceable approximately in the transverse direction of the vehicle by way of an adjusting motor and supports the support spring. With its inner end, this guide member is pivotally connected at an intermediate lever. This intermediate lever is pivotally supported at the vehicle body about a pivot axis extending approximately in the vehicle longitudinal direction an is connected at its lower end with the adjusting motor by way of lateral tie rods.

Matschinsky, U.S. Pat. No. 4,664,412 describes a wheel suspension for steerable wheels, especially front wheels of motor vehicles, with a wheel carrier supporting the wheel; an upper cross guide member and a tie rod displaceable in its longitudinal direction are pivotally connected at this wheel carrier. The lower cross guide member supporting the vehicle support spring is connected by way of a corner-rigid pivot joint with an intermediate member, at which in turn the wheel carrier is supported by way of a corner-rigid pivot bearing having approximately vertical axis and a possibility of displacement in the direction of this axis.

Eisenach, French patent No. 1,221,774 describes an elastic suspension for vehicular automobiles separately suspended.

Marot, French patent No. 1,252,770 describes a form of suspension for vehicles.

The prior art teaches a tricycle suspension in a land vehicle. It also teaches the use of an upper and lower control arm and a pivot arm pivotally mounted to the control arms. But the prior art does not teach shock mounting of the upper control arm in such a manner that the shock absorbing means is not adjacent to the steered wheel. The prior art also does not teach the use of an upper control arm configured for transfer of road forces to the shock absorbing means. The present invention fulfills these needs and provides further related advantages as described in the following summary.

SUMMARY OF THE INVENTION

The present invention teaches certain benefits in construction and use which give rise to the objectives described below.

The present invention provides a means for suspending from above, and steering a single front wheel for a tricycle type vehicle. The invention provides an upper and lower control arms and a pivot arm. The arms are joined by ball joints so as to enable smooth and consistent motion of the wheel both in reaction to road contour and roughness and in driving the vehicle around corners as well, while assuring that the tire always assumes a proper attitude for optimal safe and efficient function.

A primary aspect of the present invention is to provide a simplified, low cost, and highly effective single wheel vehicle suspension and steering apparatus having advantages not taught by the prior art.

Another aspect of the invention is to achieve vertical motion of the wheel while assuring favorable changes in camber during steering, and with a constant caster angle.

A further aspect of the invention is to provide a wheel mounting structure that is able to withstand lateral loading.

A further aspect of the invention is to provide a suspension structure wherein a shock absorbing means of the invention is placed within the vehicle enclosure away from the steered wheel and wherein the range of motion of the shock absorbing means may be a selected fraction of the range of motion of the suspended wheel.

Other features and advantages of the present invention will become apparent from the following more detailed description, taken in conjunction with the accompanying drawings, which illustrate, by way of example, the principles of the invention.

BRIEF DESCRIPTION OF THE DRAWING

The accompanying drawings illustrate the present invention. In such drawings.

DETAILED DESCRIPTION OF THE PREFERRED EMBODIMENT

The above described drawing figures illustrate the invention, a vehicle suspension and steering apparatus for use on a three wheeled vehicle 3. A wheel 5 is therefore mounted onto the apparatus for supporting and steering the vehicle 3. The apparatus and the wheel 5 are preferably mounted at the front of the vehicle 3.

Figure 1:
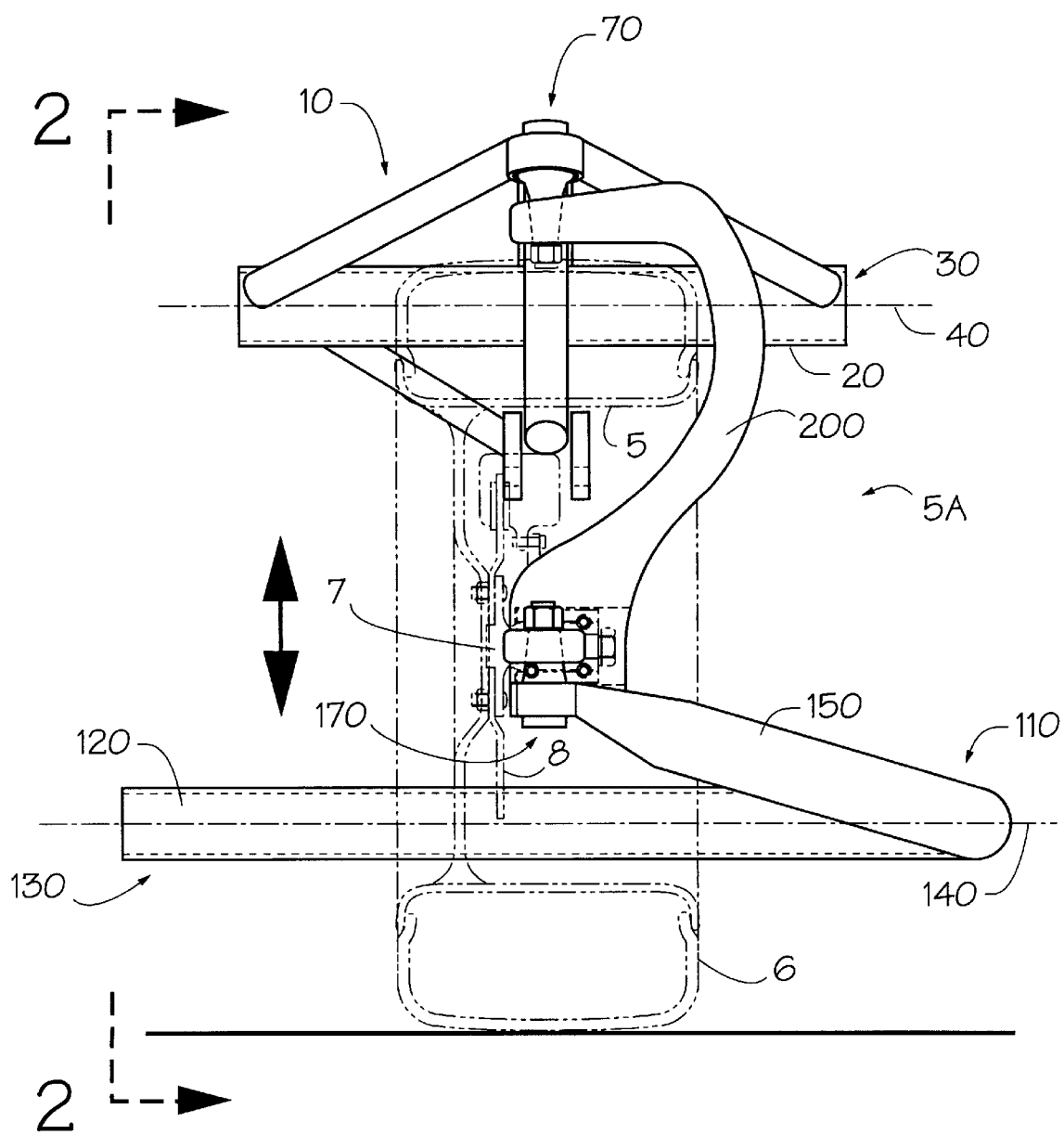
FIG. 1 is a front elevational view of the preferred embodiment of the present invention.
Figure 2:
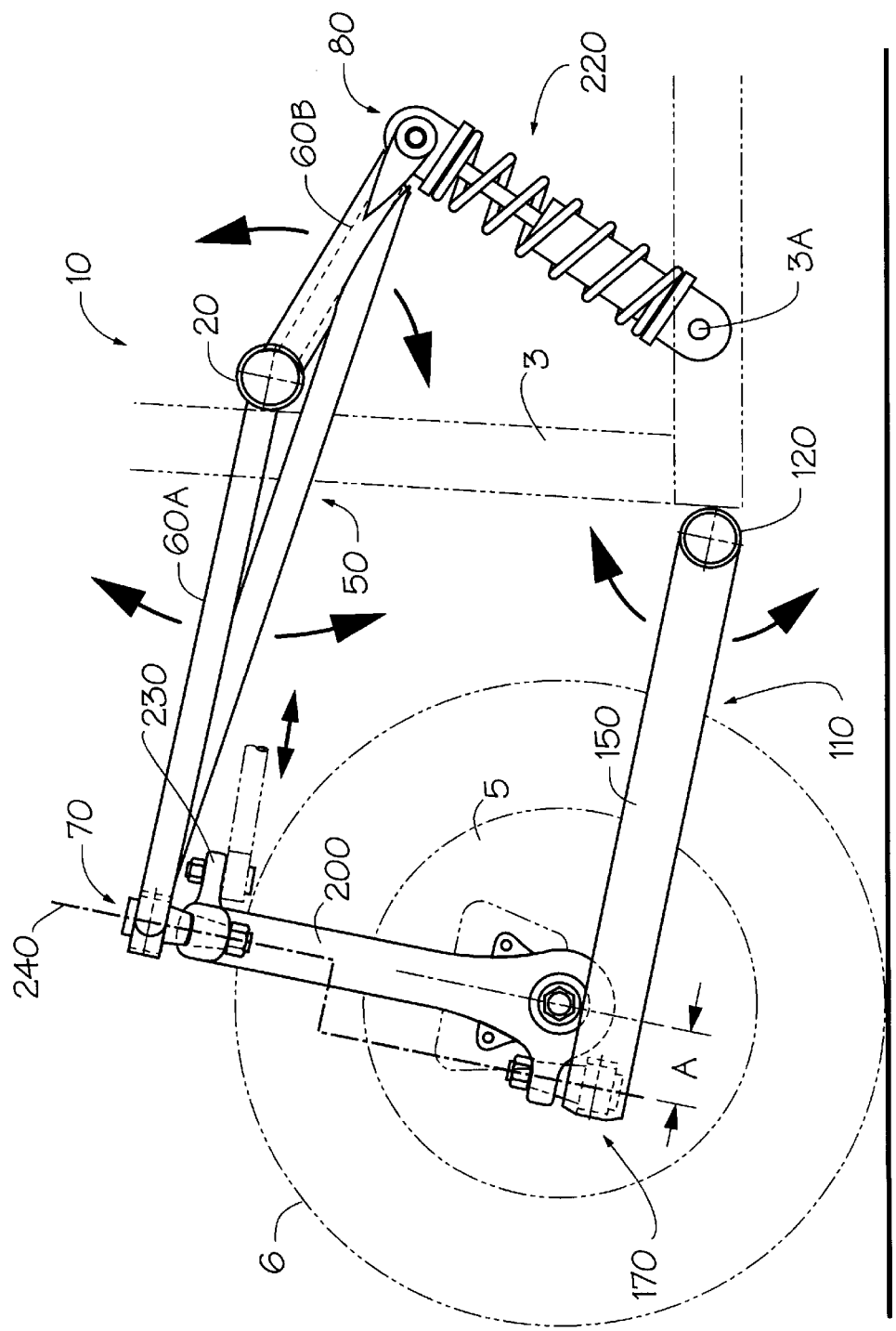
FIG. 2 is a side elevational view thereof.
Figure 3:
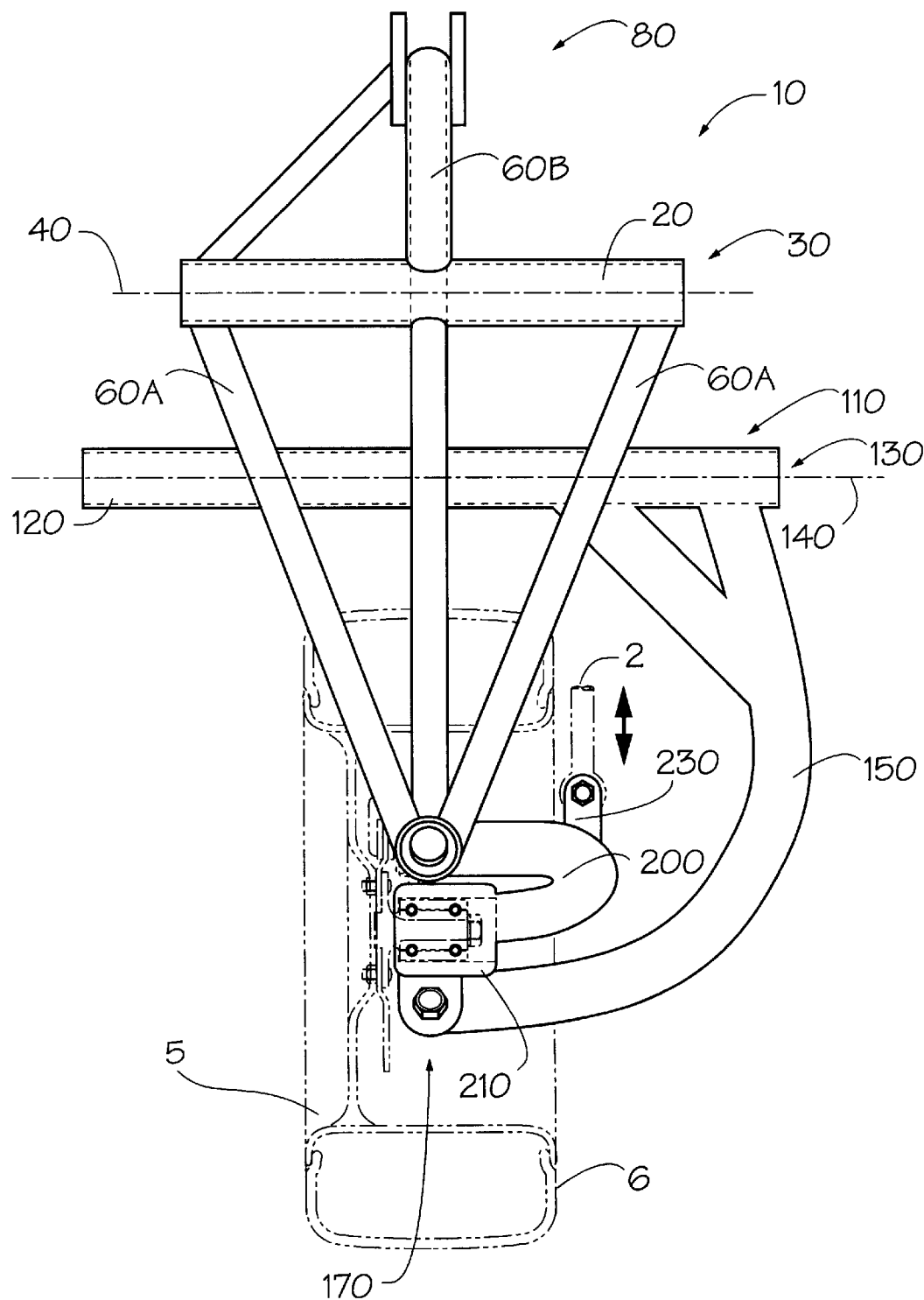
FIG. 3 is a top plan view thereof.

As shown in FIGS. 1–3, the apparatus includes an upper control arm means 10 providing a horizontally oriented upper tube 20, rotatably engaged in a first lateral position 30 on the vehicle 3, for rotation about a fixed position on the vehicle 3, preferably on bushings or bearings, about an upper control axis 40. Integral with the upper tube 20 is an upper support arm means 50 having a first leg means 60A extending forward of the upper tube 20 and terminating with an upper steering coupling means 70 preferably a ball joint. The first leg means 60A preferably extends above the wheel 5 and moves vertically with the wheel when in operation. Integral with the upper tube 20, is a second leg means 60B extending rearward from the upper tube 20 and terminating with a biasing means coupling means 80 which may be any form of mechanical pivot engagement device.

A lower control arm means 110 provides a horizontally oriented lower tube 120, rotatably engaged in a fixed, second lateral position 130 on the vehicle 3, for rotation preferably on bushings or bearings, about a lower control axis 140 which is parallel with the upper control axis 40. Integral therewith is a lower support arm means 150 which extends forward of the lower tube 120 and terminates with a lower steering coupling means 170, preferably another ball joint, positioned below and forward of the upper steering coupling means 70. The lower support arm means 150 extends around one of the sides 5A of the wheel 5. Importantly, the first leg means 60A of the upper control arm means 10 and the lower support arm means 150 are oriented in mutually parallel positions and are of approximately equal length, so that vertical motion of the wheel is reflected in simultaneous changes in the positions of these members and results in smooth action with relatively little wear on the bearing surfaces associated with the associated interconnecting elements of the invention. It has been found that this parallel relationship and equal length relationship as previously described provides for improved smoothness and less wear during operation, so that these relationships are considered inventively novel in the invention. The ball joints are located on a steering axis 240 oriented on the vertical centerline of the wheel 5. This inventive arrangement has been discovered to be necessary for the wheel to pivot about its own vertical center line so as to achieve necessary control during the maneuvering of curves in the road and for even wear of the tire. This is considered to be a novel inventive aspect in the invention. Caster is defined by the locations of the upper and lower ball joints and is preferably 7–10 degrees, i.e., the angle between a vertical and the steering axis 240. This is considered to be a novel inventive aspect in the invention.

A pivot arm 200 extends between the upper and lower steering coupling means 70, 170 and is pivotally engaged so that the pivot arm 200 is free to rotate about the steering axis 240, the pivot arm 200 further providing a wheel mounting means 210 as best seen in FIG. 3, for mounting the wheel 5 on the pivot arm 200 in a position adjacent to, and rearward of, the lower steering coupling means 170 by an amount shown in FIG. 2 by reference designation "A". The positioning of lower steering coupling means 170 forward, by an amount "A", of the center of mounting means 210 provides for an appropriate camber when wheel 5 is positioned for steering. This is considered to be a novel inventive aspect in the invention.

The pivot arm 200 is preferably C-shaped so as to be able to extend around the one side 5A of the wheel 5. The pivot arm 200 further provides a steering link attachment means 230 such that steering forces on the attachment means 230 move the pivot arm 200 about the steering axis 240 so as to steer the wheel 5. In FIG. 1 are shown tire 6, wheel hub 7 and brake rotor 8 so as to enable a further understanding of the wheel 5, its mounting and functional relationships with the apparatus and the vehicle 3.

A biasing means 220, preferably a spring loaded automotive shock absorber, is engaged with the biasing means coupling means 80 and is further engaged with the vehicle 3 at position 3A in FIG. 2, such that rocking movement of the upper control arm means 10 about the upper control axis 40 is counteracted by the biasing means 220 so as to urge the upper control arm means 10 toward a nominal position which is shown in FIG. 2. This arrangement allows the biasing means 220 to be placed within the body of the vehicle 3, and out of sight. This arrangement also allows the excursion of the biasing means 220 to be a fraction of the excursion of wheel 5. This is considered to be a novel inventive aspect in the invention. The upper and lower control arm means 10, 110 each establishes a position of its respective ball joint and allows wheel excursion in an arc described about the respective point of pivotal motion.

Steering is facilitated by a steering rod 2, extending from the vehicle 3. The pivot point of the steering attachment means 230 is offset to one side of the pivot arm 200 as shown in FIG. 3 to provide a moment arm for steering force amplification. Preferably steering is accomplished by the use of a handlebars (not shown) as with a motorcycle. Alternately, a steering wheel with gearbox could be used, but a handlebar or tiller system is more natural and more precise as well. Steering rod 2 location is important so as to minimize effects of suspension travel or steerability.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. A wheel suspension and steering apparatus for use on a vehicle providing a wheel for steering the vehicle, the apparatus comprising:

an upper control arm means providing a horizontally oriented upper tube, rotatably engaged in a first lateral position on the vehicle, for rotation about an upper control axis, and integral therewith, an upper support arm means having a first leg means extending forward of the upper tube and terminating with an upper steering coupling means, and a second leg means extending rearward of the upper tube and terminating with a biasing means coupling means;

a lower control arm means providing a horizontally oriented lower tube, rotatably engaged in a second lateral position on the vehicle, for rotation about a lower control axis, and integral therewith, a lower support arm means extending forward of the lower tube and terminating with a lower steering coupling means positioned below and forward of the upper steering coupling means;

a pivot arm extending between the upper and lower steering coupling means and pivotally engaged therewith so that the pivot arm is free to rotate about a steering axis drawn between the upper and the lower steering coupling means, the pivot arm further providing a wheel mounting means for mounting the wheel on the pivot arm in a position adjacent to, and rearward of, the lower steering coupling means;

a biasing means engaged with the biasing means coupling means and further engaged with the vehicle such that rocking movement of the upper control arm means about the upper control axis is counteracted by the biasing means so as to urge the upper control arm means toward a nominal position;

the pivot arm further providing a steering link attachment means such that steering forces on the attachment means moves the pivot arm about the steering axis so as to steer the wheel.

2. The apparatus of claim 1 wherein the first leg means extends above the wheel, wherein the lower support arm means extend around one of the sides of the wheel.

3. The apparatus of claim 2 wherein the pivot arm is C-shaped and extends around said one of the sides of the wheel.

4. The apparatus of claim 2 wherein the first leg means of the upper control arm means and the lower support arm means are oriented in mutually parallel positions.

5. The apparatus of claim 4 wherein the first leg means of the upper control arm means, and the lower support arm means are approximately of equal length.

6. The apparatus of claim 1 wherein the biasing means is a spring loaded automotive shock absorber.

7. The apparatus of claim 1 wherein the upper and the lower steering coupling means are ball joints.

* * * * *